US008973724B2

(12) United States Patent
Hindle et al.

(10) Patent No.: US 8,973,724 B2
(45) Date of Patent: Mar. 10, 2015

(54) VIBRATION ISOLATORS AND ISOLATION SYSTEMS

(75) Inventors: Timothy A. Hindle, Peoria, AZ (US); Brett M. McMickell, Scottsdale, AZ (US); Toren S. Davis, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 2365 days.

(21) Appl. No.: 11/778,979

(22) Filed: Jul. 17, 2007

(65) Prior Publication Data

US 2009/0020381 A1    Jan. 22, 2009

(51) Int. Cl.
 *F16F 15/03* (2006.01)
(52) U.S. Cl.
 USPC ...................................... 188/267; 267/140.14
(58) Field of Classification Search
 USPC ................ 188/267, 164; 267/140.14, 140.15; 381/182
 See application file for complete search history.

(56) References Cited

U.S. PATENT DOCUMENTS

| 4,624,435 | A | * | 11/1986 | Freudenberg | 248/550 |
|---|---|---|---|---|---|
| 4,720,868 | A | * | 1/1988 | Hirano | 381/182 |
| 5,277,125 | A | * | 1/1994 | DiFonso et al. | 104/292 |
| 5,332,070 | A | | 7/1994 | Davis et al. | |
| 5,427,362 | A | * | 6/1995 | Schilling et al. | 267/140.14 |
| 5,718,418 | A | * | 2/1998 | Gugsch | 267/140.14 |
| 6,003,849 | A | | 12/1999 | Davis et al. | |
| 6,920,966 | B2 | * | 7/2005 | Buchele et al. | 188/300 |
| 2006/0243549 | A1 | * | 11/2006 | Young | 188/267 |
| 2009/0199644 | A1 | * | 8/2009 | Aoyagi | 73/654 |

* cited by examiner

*Primary Examiner* — Xuan Lan Nguyen
(74) *Attorney, Agent, or Firm* — Ingrassia Fisher & Lorenz, P.C.

(57) ABSTRACT

In an embodiment, and by way of example only, a vibration isolator is used for coupling between a payload and a base and includes a rod, a magnetic damper, a first spring, and a second spring. The magnetic damper includes a movable section and stationary section. The movable section comprises a conductive material and has an opening through which the rod extends. The stationary section includes a magnet disposed around and spaced apart from the movable section and is coupled to the base. The first spring couples the movable section to the rod. The second spring is coupled to the rod and stationary section. In another embodiment, the vibration isolator also includes a voice coil actuation system.

8 Claims, 5 Drawing Sheets

VIBRATION ISOLATORS AND ISOLATION SYSTEMS

TECHNICAL FIELD

The inventive subject matter generally relates to vibration damping and isolation, and more particularly relates to vibration isolators and isolation systems.

BACKGROUND

A structural system supporting a precision sensor, such as a telescope, as its payload may be susceptible to vibration disturbances that result in measurement or pointing errors. Vibration disturbances may be attributed to mechanical components or assemblies, such as reaction wheel assemblies, motors, or pumps that are common in structural systems. Structural systems tend not to have significant inherent damping to attenuate vibrations that may degrade system performance.

Active and passive vibration isolators are designed to attenuate the vibration and to isolate the payload from structural dynamics of the base. One example of a passive-mass damping and isolation system is a D-STRUT™ vibration isolator, manufactured by Honeywell, Inc. of Morristown, N.J. The D-STRUT™ vibration isolator is a three-parameter vibration isolation system that mechanically acts like a spring ($K_A$) in parallel with a spring ($K_B$) in series with a damper ($C_A$). D-STRUT™ vibration isolator is disclosed in U.S. Pat. No. 5,332,070 entitled "Three Parameter Viscous Damper and Isolator" to Davis et al.

The D-STRUT™ vibration isolator includes a hollow shaft and a piston that is configured to slidably move through the shaft. The piston includes a flange that extends radially from a midsection thereof. The flange has a top surface that is coupled to a first sealed bellows and a bottom surface that is coupled to a second sealed bellows. Each of the bellows has a chamber that is filled with fluid. Thus, when the piston moves axially through the shaft, fluid flows from one of the bellows chambers to the other.

An example of an active damping and isolation system is the Hybrid D-STRUT™ vibration isolator, manufactured by Honeywell, Inc. of Morristown, N.J. The Hybrid D-STRUT™ includes the passive damping mechanism of the passive D-Strut™ and an active enhancement mechanism. The active enhancement mechanism enhances the force dissipation of the passive damping mechanism and includes an actuator mechanism which has a voice coil actuator system (such as a Lorentz force actuator). The Hybrid D-STRUT™ is disclosed in U.S. Pat. No. 6,003,849 entitled "Hybrid Isolator and Structural Control Actuator Strut" to Davis and Hyde.

Although conventional passive and active vibration isolators, such as the examples described above, are generally useful for damping vibrations in most circumstances, they may be improved. For example, the vibration isolators may not operate as desired when employed in cryogenic (e.g., below −120° C.) environments. In particular, the fluid that fills the chamber of the vibration isolators may increase in viscosity or change phase from liquid to solid when exposed to such temperatures. As a result, the vibration isolator may not perform as desired. Gases may be used in place of the fluid; however, the gas is typically contained in a highly pressurized chamber, which if damaged, may leak in a vacuum environment.

Accordingly, it is desirable to have a vibration isolator that is improved over conventional vibration isolators. Additionally, it is desirable to have a vibration isolator that may be used to isolate vibration when exposed to cryogenic environment. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

An apparatus is provided for vibration damping and isolation.

In an embodiment, and by way of example only, a vibration isolator is used for coupling between a payload and a base and includes a rod, a magnetic damper, a first spring, and a second spring. The magnetic damper includes a movable section and stationary section. The movable section comprises a conductive material and has an opening through which the rod extends. The stationary section includes a magnet disposed around and spaced apart from the movable section and is coupled to the base. The first spring couples the movable section to the rod. The second spring is coupled to the rod and stationary section.

In another embodiment, and by way of example only, the vibration isolator includes a rod, a voice coil actuation system, a magnetic damper, a first spring, and a second spring. The voice coil actuation system includes a movable section and stationary section, the movable section coupled to the rod and including a winding configured to receive current therethrough, and the stationary section spaced apart from and disposed around the movable section, wherein when current flows through the winding, a force is created between the movable section and the stationary section. The magnetic damper includes a movable section and stationary section, the movable section comprises a conductive material and has an opening through which the rod extends, and the stationary section including a magnet disposed around and spaced apart from the movable section and coupled to the base and to the voice coil actuation system stationary section. The first spring couples the movable section of the voice coil actuator system to the movable section of the magnetic damper. The second spring couples the rod to the base.

In still another embodiment, and by way of example only, an isolation system is provided that includes a payload, a base proximate to the payload, and a vibration isolator coupled between the payload and the base. The vibration isolator includes a rod, a magnetic damper, a first spring, and a second spring. The magnetic damper includes a movable section and stationary section. The movable section comprises a conductive material and has an opening through which the rod extends. The stationary section includes a magnet disposed around and spaced apart from the movable section and is coupled to the base. The first spring couples the movable section to the rod. The second spring is coupled to the rod and stationary section.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description of the inventive subject matter is merely exemplary in nature and is not intended to limit the inventive subject matter or the application and uses of the inventive subject matter. Furthermore, there is no intention to be bound by any theory presented in the preceding background of the inventive subject matter or the following detailed description of the inventive subject matter.

Figure 1:
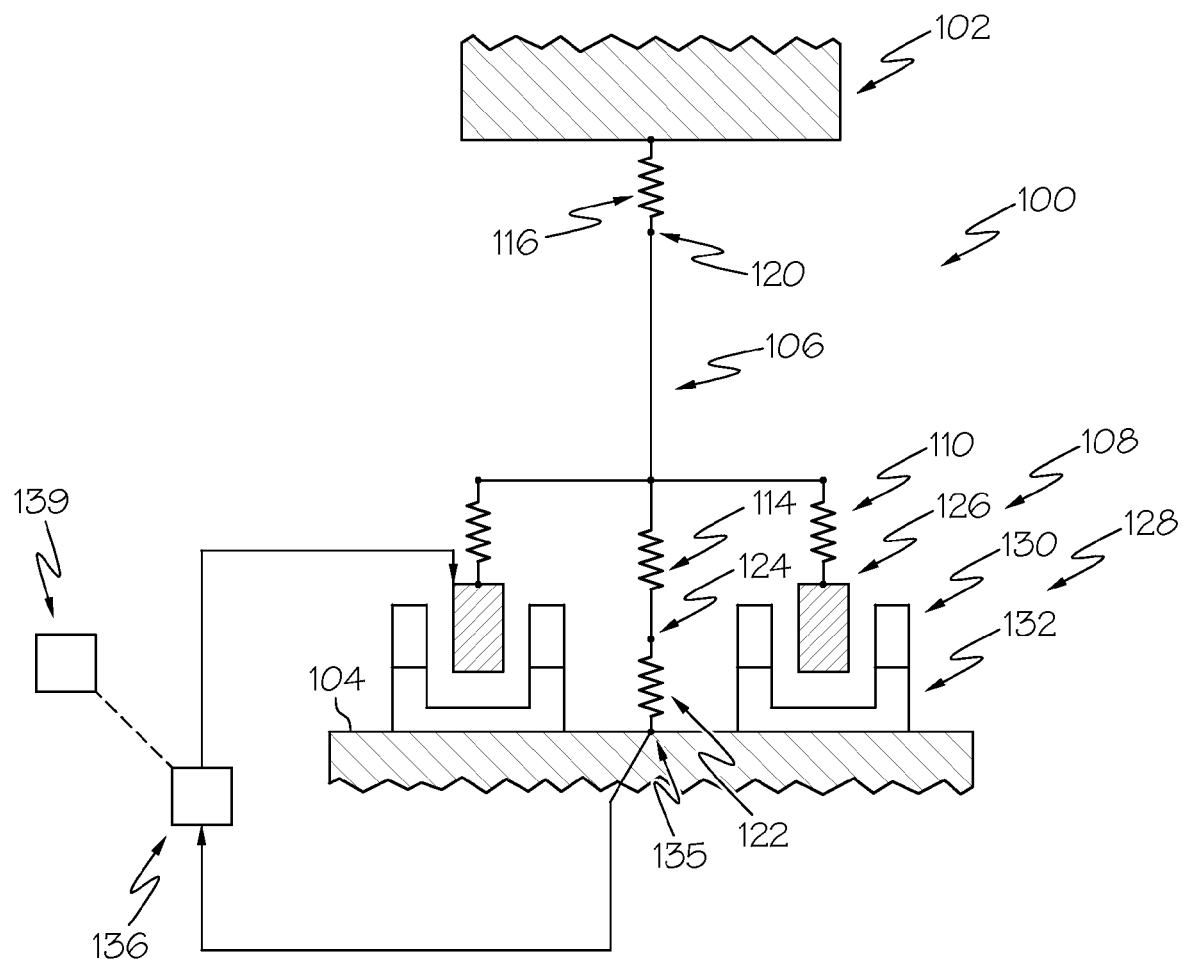
FIG. 1 is a schematic of a vibration isolator, according to an embodiment.

FIG. 1 is a schematic of a vibration isolator 100, according to an embodiment. The vibration isolator 100 is configured to be coupled between a payload 102 and a base 104. In an embodiment, the vibration isolator 100 may be a passive isolator and, in this regard, may include a rod 106, a magnetic damper 108, a first spring 110, and a second spring 114. The vibration isolator 100 is typically mounted to the payload 102 via a first end 120 of the rod 106. In an embodiment, the first end of 120 includes a payload attachment spring 116 thereon that couples the vibration isolator 100 to the payload 102. The payload attachment spring 116 may be a flexure or other similar structure capable of attaching the vibration isolator 100 to the payload 102.

Figure 2:
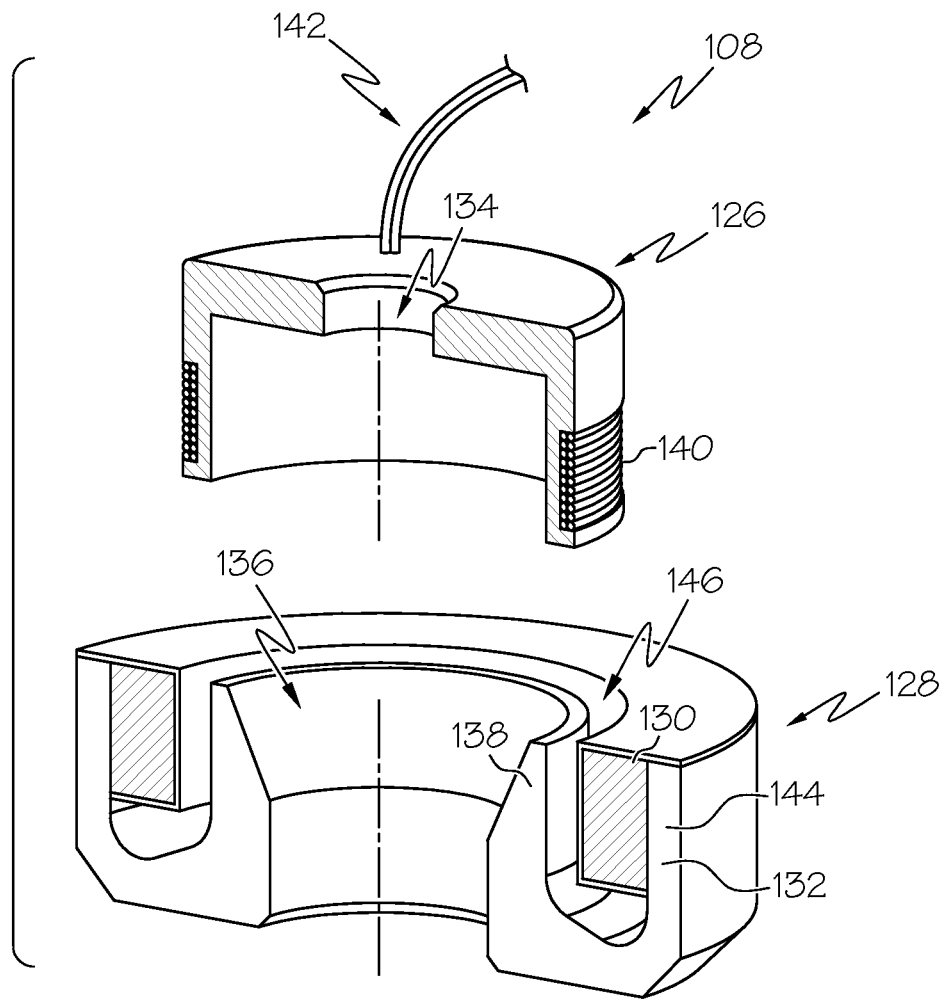
FIG. 2 is a cross-sectional view of a magnetic damper that may be implemented into a vibration isolator, according to an embodiment.

The magnetic damper 108 damps the vibrations that may be received by the vibration isolator 100. FIG. 2 is a cross-section view of a magnetic damper 108 that may be implemented into the vibration isolator 100, according to an embodiment. The magnetic damper includes a movable section 126 and a stationary section 128 and is configured to create eddy currents in the movable section 126 so that when vibrations travel therethrough, the eddy current flow causes the movable section 126 to resists motion to thereby damp vibration.

The movable section 126 has an opening 134 through which the rod 106 extends. In an embodiment, the movable section 126 is made of a conductive material, such as metal. In another embodiment, the movable section 126 may be configured as an active component, and may additionally include a winding 140 disposed thereon that communicates with a microprocessor/power source 136 (shown in FIG. 1) via, for example, a lead wire 142 so that an electromagnet may be created when current flows through the winding 140.

The stationary section 128 is disposed adjacent to the movable section 126 and is made up of one or more magnets 130 that provide a magnetic field. The magnets 130 may be disposed around and spaced apart from the movable section 126. In another embodiment, the magnets 130 may be a plurality of rings. Alternatively, the magnets 130 may be a plurality of magnets disposed in one or more rings or another shape. In any case, the magnets 134 may be of permanently magnetic material or may be an electromagnet.

To maintain the magnets 130 spaced apart from the movable section 126, the stationary section 128 may be configured to include a housing 132. In an embodiment, the housing 132 may be a doubled wall annulus having an inner wall 138, an outer wall 144, an axial groove 146 there between, and a central opening 136. The magnets 130 may be disposed in the axial groove 146 and couple to the outer wall 144, as shown in FIG. 2. In another embodiment, the magnet 130 may be coupled to the inner wall 138. In either case, a section of the movable section 126 is positioned in the axial groove 146. In the embodiment in which the movable section 126 includes a winding 140, the section of the movable section 126 that includes the winding 140 is positioned in the axial groove 146.

With additional reference to FIG. 1, the movable section 126 does not contact the rod 106, but is coupled thereto via the first spring or "rod attachment spring" 110. The rod attachment spring 110 may be selected according to a desired stiffness to thereby control movement of the movable section 126 relative to the rod 106. In an embodiment, the rod attachment spring 110 may be tuned or a tunable mechanical spring.

The rod 106 extends through the magnetic damper 108 and is coupled to the stationary section 128 of the magnetic damper via the second spring 114. In an embodiment, the second spring 114 may be tuned or a tunable a mechanical spring The vibration isolator 100 is typically mounted to the base 104 via an end 124 of the second spring 114. In an embodiment, the end 124 includes a base attachment spring 122 thereon to thereby couple the vibration isolator 100 to the base 104. The base attachment spring 122 may be a flexure or other similar structure capable of attachment vibration isolator 100 to the base 104.

In an embodiment, the movable section 126 may include a sensing system. The sensing system may be a force sensor 135 positioned at the end 124 of the second spring 114. In an embodiment that includes the base attachment spring 122, the force sensor 135 may be positioned at the end of the base attachment spring 122. In any case, the force sensor 135 may be coupled to the microprocessor/power source 136 which may continuously vary current delivery to the winding 140 to thereby cause the compressive and extensive forces to enhance vibratory and shock dissipation of the vibration isolator 100.

In another embodiment, the sensing system may be a feedback sensor 139 that is located remotely from and externally to the vibration isolator 100. The feedback sensor 139 may be configured to sense changes in forces (such as payload motion) on the vibration isolator 100. The feedback sensor 139 may be coupled to the microprocessor/power source 136 and may operate in a similar manner to that of the force sensor 135.

Figure 3:
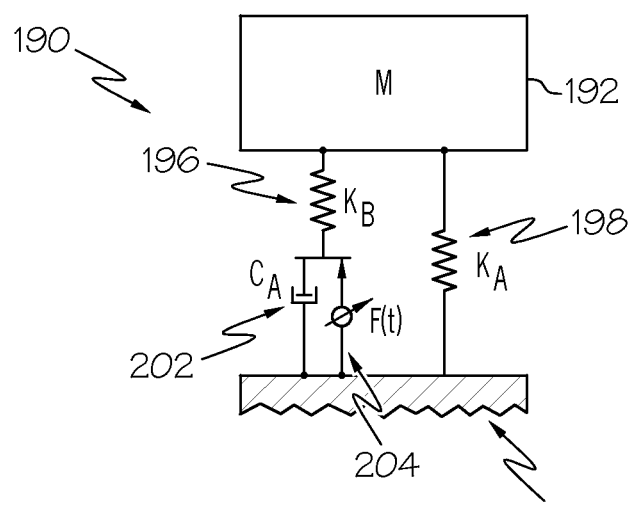
FIG. 3 is a simplified schematic of a three-parameter system that may be provided by a passive vibration isolator during damping and isolation, according to an embodiment

During operation, the vibration isolator 100 provides a three-parameter isolation system with reference to FIG. 3, a simplified schematic is shown of the three-parameter isolator system 190 that may be provided by the vibration isolator 100 during damping and isolation according to an embodiment. This type of system may be modeled with a first spring in parallel with a second spring in series with a damper. As shown in FIG. 3, the three-parameter isolator system 190 includes a payload or mass 192, a first spring 198, a base 200, a damping mechanism 202, and a second spring 196. The first spring 198 has a spring constant associated therewith that can be designated $K_A$. Similarly, the second spring 196 has a spring constant that can be designated $K_B$, and the damping effect of the damping mechanism 202 that can be designated $C_A$. The mass associated with the mass 192 can be designated M. An embodiment of the vibration isolator 100 may include a continuously varying force 204. The continuously varying force 204 can be designated F(t).

As shown in FIG. 3, the first spring 198 is coupled to both the mass 192 and the base 200. The second spring 196 is coupled to both the mass 192 and the damping mechanism 202. The damping mechanism 202, in turn, is coupled between the second spring 196 and the base 200. As a result, the first spring 198 and damping mechanism 202 are both connected to the same point on the base 200. The continuously varying force 204 is coupled to both the second spring 196 and the base 200 and is parallel to the damping mechanism 202 and in series with the second spring 196.

With additional reference to FIG. 1 and applying the three-parameter isolator system 190 to the vibration isolator 100, the first spring 198 may be the payload attachment spring 116, which is disposed between the payload 102 and the rod 106, the second spring 114, and the base attachment spring 122. The second spring 196 may be the series connection of the rod attachment spring 110 and payload attachment spring 116. The damping mechanism 202 may be the magnetic damper 108. The continuously varying force 206 may be the continuously varying compressive and extensive force caused by the continuously varying current delivered to the winding 140 that is controlled by the microprocessor/power supply 136.

Thus, by appropriately selecting values for each of these components, the three-parameter isolator system 190 can be "tuned" to avoid the undesirable vibrations at the typical operating frequencies associated with the mass 102 and maximize damping at high frequencies. In addition, unlike conventional isolators, the vibration isolator 100 does not include fluid and thus, may be used in a cryogenic thermal environment.

Figure 4:
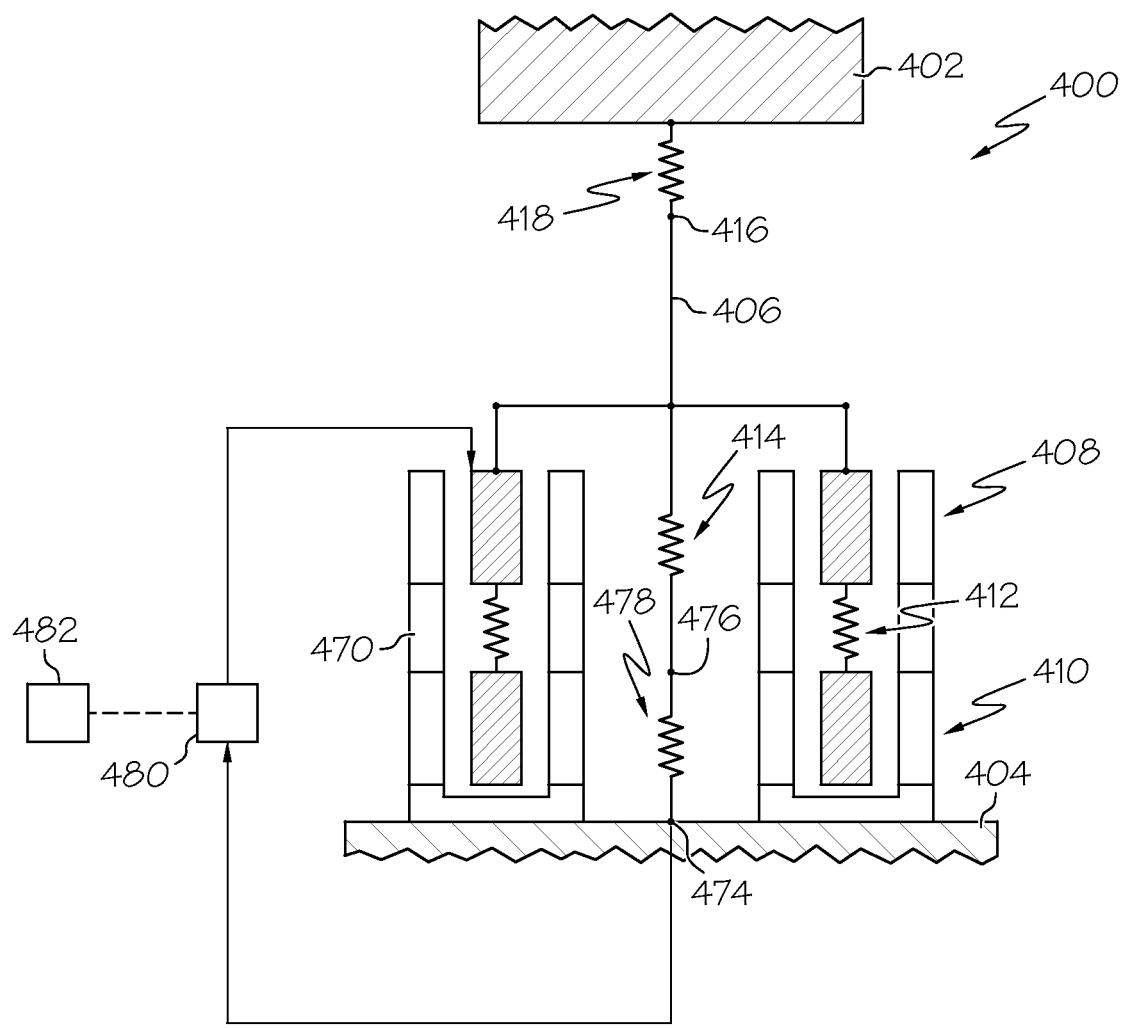
FIG. 4 is schematic of a vibration isolator, according to an embodiment.

In another embodiment, the vibration isolator 100 may be an active isolator. FIG. 4 is a schematic of a vibration isolator 400, according to such an embodiment. The vibration isolator 400 is configured to be coupled between a payload 402 and a base 404. In this regard, the vibration isolator 400 includes a rod 406, a voice coil actuator system 408, a magnetic damper 410, a first spring 412, and a second spring 414. The vibration isolator 400 may be mounted to the payload 402 via a first end 416 of the rod 406. In an embodiment, the first end of 416 includes a payload attachment spring 418 thereon that couples to the vibration isolator 400 to the payload 402. The payload attachment spring 418 may be a flexure or other similar structure capable of attaching the vibration isolator 400 to the payload 402.

Figure 5:
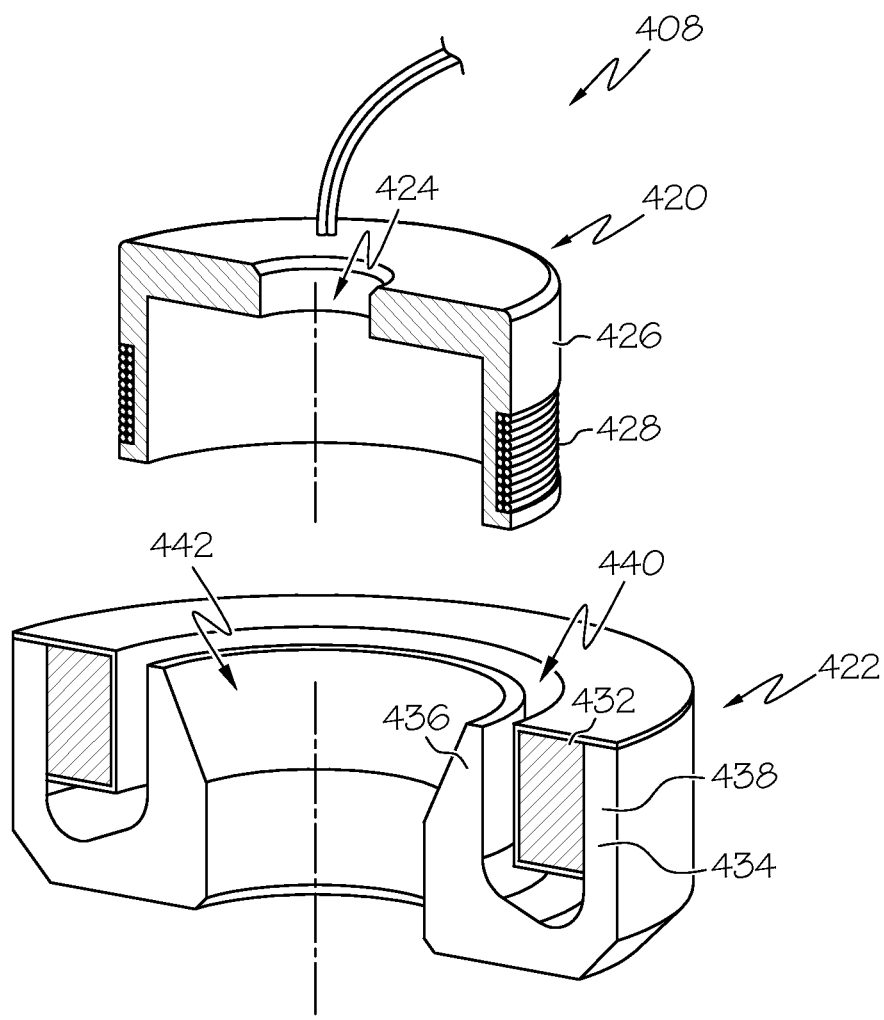
FIG. 5 is a cross-sectional view of a voice coil actuator system that may be implemented into a vibration isolator, according to an embodiment.

The voice coil actuator system 408 may be a Lorentz force actuator that is designed to provide electromotive force to the vibration isolator 400. FIG. 5 is a cross-section view of a voice coil actuator system 408 that may be implemented into the vibration isolator 400, according to an embodiment. The voice coil actuator system 408 may be made up of a voice coil movable section 420 that is movable relative to voice coil stationary section 422. The voice coil movable section 420 has an opening 424 through which the rod 406 extends. The voice coil movable section 420 includes a light weight structure 426 and a coil 428. The voice coil stationary section 422 is disposed adjacent to the movable section 420 and is made up of one or more magnets 432 that provide a magnetic field. The magnets 432 may be coupled to the outer wall 438, as shown in FIG. 5. In another embodiment, the magnets 432 may be a plurality of rings. Alternatively, the magnets 432 may be a plurality of magnets disposed in one or more rings or another shape. In any case, the magnets 432 may be of permanently magnetic material or may be an electromagnet.

To maintain the magnets 432 spaced apart from the voice coil movable section 420, the voice coil stationary section 422 may be configured to include a housing 434. In an embodiment, the housing 434 may be a doubled wall annulus having an inner wall 436, an outer wall 438, an axial groove 440 there between, and a central opening 442. The magnets 432 may be disposed in the axial groove 440 and couple to the outer wall 438, as shown in FIG. 5. In another embodiment, the magnet 432 may be coupled to the inner wall 436. In either case, a section of the voice coil movable section 420 is positioned in the axial groove 440.

Figure 6:
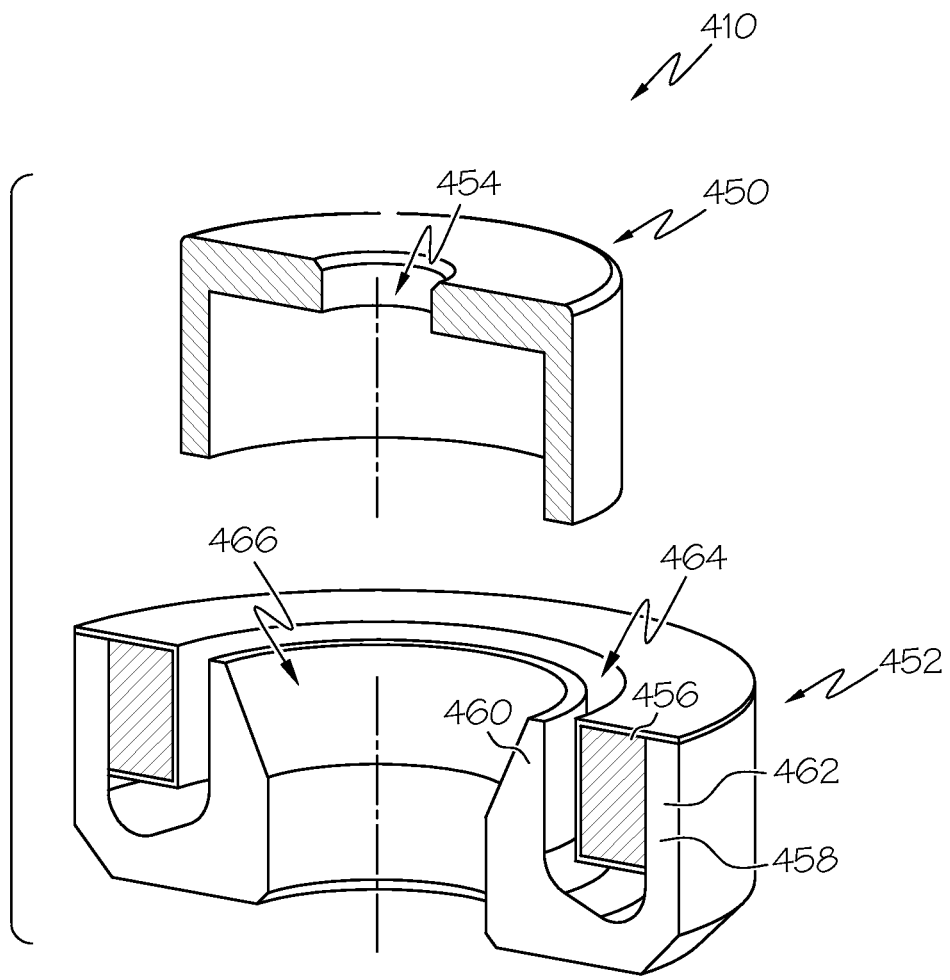
FIG. 6 is a cross-sectional view of a magnetic damper that may be implemented into a vibration isolator, according to an embodiment.

The magnetic damper 410 passively damps the vibrations that may be received by the vibration isolator 400. FIG. 6 is a cross-section view of a magnetic damper 410 that may be implemented into the vibration isolator 400, according to an embodiment. The magnetic damper 410 includes a damper movable section 450 and a damper stationary section 452 that is configured to create eddy currents in the damper movable section 450. Thus, when vibrations travel through the damper movable section 450, the eddy current flow causes the damper movable section 450 to resist motion to thereby damp the vibration.

The damper movable section 450 has an opening 454 through which the rod 406 extends. The damper movable section 450 is made of a conductive material, such as metal. The stationary section 452 is disposed adjacent to the movable section 450 and is made up of one or more magnets 456 that provide a magnetic field. The magnets 456 may be disposed around and spaced apart from the damper movable section 450. In another embodiment, the magnets 456 may be a plurality of rings. Alternatively, the magnets 456 may be a plurality of magnets disposed in one or more rings or another shape. In any case, the magnets 456 may be of permanently magnetic material or may be an electromagnet.

To maintain the magnets 456 spaced apart from the damper movable section 450, the stationary section 452 may be configured to include a housing 458. In an embodiment, the housing 458 may be a doubled wall annulus having an inner wall 460, an outer wall 462, an axial groove 464 there between, and a central opening 466. The magnets 456 may be coupled to the outer wall 462, as shown in FIG. 6. In another embodiment, the magnet 456 may be coupled to the inner wall 460. In either case, a section of the movable section 450 is positioned in the axial groove 464.

With additional reference to FIG. 4, in an embodiment, the voice coil stationary section 422 is coupled to the damper stationary section 452 by a mounting structure 470. In another embodiment, the voice coil stationary section 422 and the damper stationary section 452 may be independently coupled to the base 404.

In still another embodiment, the movable section 426 of the voice coil actuation system 408 may not be directly attached to the movable section 450 of the magnetic damper 410, but may instead be coupled thereto via the first spring or "attachment spring" 412. The attachment spring 412 may be selected according to a desired stiffness to thereby control movement of the movable section 450 of the magnetic damper relative to the movable section 420 of the voice coil actuator system 408. In an embodiment, the attachment spring 412 may be tuned or a tunable mechanical spring.

The vibration isolator 400 is typically mounted to base 404 via a first end 476 of the second spring 414. For example, the rod 406 may extend through the voice coil actuator system 408 and the magnetic damper 410 and may be coupled to the base 404 via the second spring 414. In an embodiment, the second spring 414 may be tuned or a tunable a mechanical spring. In another example, the first end 476 of the second spring 414 includes a base attachment spring 478 thereon.

The base attachment spring 478 may be a flexure or other similar structure capable of attachment vibration isolator 400 to the base 404.

In an embodiment, the vibration isolator 400 may include a sensing system that may be made up of a force sensor 474 positioned at the first end 476 of the second spring 414. In an embodiment which includes the base attachment spring 478, the force sensor 474 may be positioned at the first end of the base attachment spring 478. The force sensor 474 may be coupled to a microprocessor/power source 480 that continuously varies current delivered to the coil 428 of the voice coil actuation system 408 such that the compressive and extensive forces thereof enhance vibratory and shock dissipation of the vibration isolator 400.

In an embodiment, the sensing system may be made up of a feedback sensor 482 disposed remote from and external to the vibration isolator 400. The feedback sensor 482 may be configured to sense changes in forces (such as payload motion) acting on the vibration isolator 400. The feedback sensor 482 may be coupled to the microprocessor/power source 480 and may operate similar to the force sensor 474.

Figure 7:
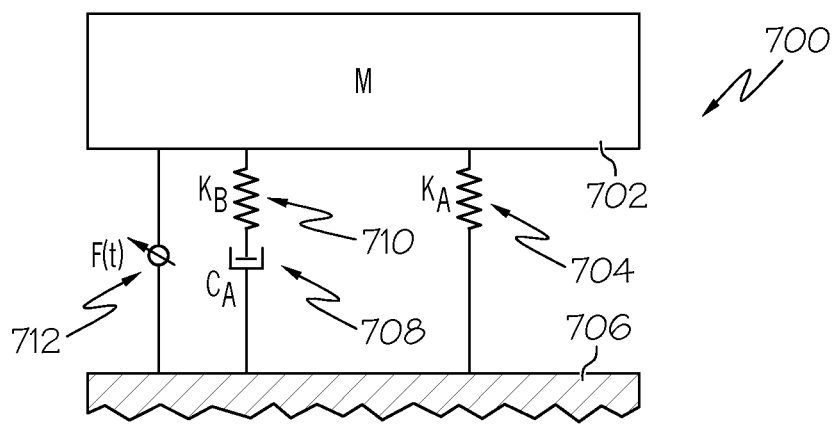
FIG. 7 is a simplified schematic of a three-parameter system that may be provided by an active vibration isolator during damping and isolation, according to an embodiment.

During operation, the vibration isolator 400 provides a three-parameter isolation system with reference to FIG. 7, a simplified schematic is shown of the three-parameter isolator system 700 that may be provided by the vibration isolator 400 during damping and isolation according to an embodiment. This type of system may be modeled with a first spring in parallel with a second spring in series with a damper. As shown in FIG. 7, the three-parameter isolator system 700 includes a payload or mass 702, a first spring 704, a base 706, a damping mechanism 708, a second spring 710, and a continuously varying force 712. The first spring 704 has a spring constant associated therewith that can be designated $K_A$. Similarly, the second spring 710 has a spring constant that can be designated $K_B$, and the damping effect of the damping mechanism 708 that can be designated $C_A$. The mass associated with the mass 702 can be designated M. The continuously varying force 712 can be designated F(t), where t indicates that the force is changing with respect to time.

As shown in FIG. 7, the first spring 704 is coupled to both the mass 702 and the base 706. The second spring 710 is coupled to both the mass 702 and the damping mechanism 708. The damping mechanism 708, in turn, is coupled between the second spring 710 and the base 706. As a result, the first spring 704 and damping mechanism 708 are both connected to the same point the base 706. The continuously varying force is modeled as a varying force 712 in the vibration isolator system 700. The varying force 712 is coupled to both the payload 702 and the base 706. As a result, the continuously varying force 712 is parallel to the series combination of the damping mechanism 708 and second spring 710. The continuously varying force 712 is also in parallel to the first spring 704.

With additional reference to FIG. 4 and applying the three-parameter isolator system 700 to the vibration isolator 400, the first spring 704 may be the series connection of the payload attachment spring 418 disposed between the payload 402 and the rod 406, the second spring 414, and the base attachment spring 478. The second spring 710 may be the series connection of the stiffness of the movable section 420 of the voice coil actuator system 408, the stiffness of the movable section 450 of the magnetic damper 410, the first spring 412, and the payload attachment spring 418. The damping mechanism 708 may be the magnetic damper 410. The continuously varying force 712 may be the continuously varying compressive and extensive force caused by the continuously varying current delivered to the coil 428 of the voice coil actuator system 408 that is controlled by the microprocessor/power supply 480.

By appropriately selecting values for each of these components, the three-parameter isolator system 700 can be "tuned" to avoid the undesirable vibrations at the typical operating frequencies associated with the mass 702 and maximize damping at high frequencies. In addition, unlike conventional isolators, the vibration isolator 700 does not include fluid and thus, may be used in cryogenic temperatures.

The vibration isolators may include a passive mechanism and/or active mechanism for use in cryogenic (e.g., below −120° C.) environment. The passive mechanism can operate to dissipate vibratory and shock forces applied to the vibration isolator. Eddy currents through the vibration isolator may generate an electromagnetic force that can resist motion to thereby dissipate vibration and shock. The active mechanism can include a voice coil actuator system that enhances the vibratory and shock dissipation by actively changing the stroke or force exerted by the vibration isolator.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A vibration isolator for coupling between a payload and base, the vibration isolator comprising:
a rod;
a magnetic damper including a movable section and stationary section, the movable section comprises a conductive material and has a winding disposed thereon, the movable section further including an opening through which the rod extends, and the stationary section including a magnet disposed around and spaced apart from the movable section and the winding, and coupled to the base;
a first spring coupling the movable section to the rod; and
a second spring coupled to the rod and stationary section, wherein:
the magnetic damper is configured to generate eddy currents in the movable section so that when vibrations travel therethrough, the eddy currents cause the movable section to resist motion to thereby damp vibration, and
the winding is configured to receive current therethrough to create a magnetic field and induce force between the movable section and stationary section of the magnetic damper.

2. The vibration isolator of claim 1, wherein the first spring comprises a tunable spring.

3. The vibration isolator of claim 1, wherein the second spring comprises a tunable spring.

4. The vibration isolator of claim 1, further comprising a third spring coupling the rod to the payload.

5. The vibration isolator of claim 1, wherein a fourth spring couples the second spring to the stationary section.

6. An isolation system comprising:
a payload;
a base proximate the payload; and
a vibration isolator for coupling between a payload and base, wherein the vibration isolator comprises:
- a rod;
- a magnetic damper including a movable section and stationary section, the movable section comprises a conductive material and has a winding disposed thereon, the movable section further including an opening through which the rod extends, and the stationary section including a magnet disposed around and spaced apart from the movable section and the winding, and coupled to the base;
- a first spring coupling the movable section to the rod; and
- a second spring coupled to the rod and stationary section, wherein:
- the magnetic damper is configured to generate eddy currents in the movable section so that when vibrations travel therethrough, the eddy currents cause the movable section to resist motion to thereby damp vibration, and
- the winding is configured to receive current therethrough to create a magnetic field and induce force between the movable section and stationary section of the magnetic damper.

7. The isolation system of claim 6, wherein the first spring comprises a tunable spring.

8. The isolation system of claim 6, wherein the second spring comprises a tunable spring.

* * * * *